US009067399B2

(12) United States Patent
Krol et al.

(10) Patent No.: US 9,067,399 B2
(45) **Date of Patent: *Jun. 30, 2015**

(54) SYSTEM FOR FORMING AN IMAGE ON FLEXOGRAPHIC MEDIA

(71) Applicant: Eastman Kodak Company, Rochester, NY (US)

(72) Inventors: Alexander Krol, Netanya (IL); Lior Perry, Tel-Aviv (IL)

(73) Assignee: EASTMAN KODAK COMPANY, Rochester, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 13/765,755

(22) Filed: Feb. 13, 2013

(65) Prior Publication Data

US 2014/0226862 A1 Aug. 14, 2014

(51) Int. Cl.
*G06T 15/00* (2011.01)
*B41C 1/05* (2006.01)

(52) U.S. Cl.
CPC ........................................ *B41C 1/05* (2013.01)

(58) Field of Classification Search
CPC ........................................................ G06T 15/00
USPC ........................................................ 382/106
See application file for complete search history.

(56) References Cited

U.S. PATENT DOCUMENTS

2011/0278767 A1* 11/2011 Aviel et al. .................... 264/400
2012/0212563 A1 8/2012 Tutt et al.

* cited by examiner

*Primary Examiner* — Stephen R Koziol
*Assistant Examiner* — Delomia Gilliard
(74) *Attorney, Agent, or Firm* — Nelson Adrian Blish

(57) ABSTRACT

A system for forming an image on a flexographic media includes a digital front end that provides a screened image; locating transition points from data regions to non-data regions in said screened image; determining a distance between pixels in adjacent data and non-data regions; if the distance is greater than a predetermined distance modify said screened image to remove a shoulder of pixels at the transition point; and an imaging device the screen modified image on the flexographic media.

6 Claims, 10 Drawing Sheets

Fig. 1- prior art

Fig. 2- prior art

Fig. 3 – prior art

Fig. 4 - prior art

Fig. 5 - prior art

Fig. 6 - prior art

SYSTEM FOR FORMING AN IMAGE ON FLEXOGRAPHIC MEDIA

CROSS REFERENCE TO RELATED APPLICATIONS

Reference is made to commonly-assigned U.S. patent application Ser. No. 13/765,748 (now U.S. Publication No. 2014/0224141), filed Feb. 13, 2013 , entitled FORMING AN IMAGE ON A FLEXOGRAPHIC MEDIA; by Krol; the disclosure of which is incorporated herein.

FIELD OF THE INVENTION

The present invention relates to methods and apparatus for image reproduction systems characterized by three-dimensional features imaged on a flexographic plate.

BACKGROUND OF THE INVENTION

In graphic arts technology, a number of well-established printing processes utilize image carriers with three-dimensional (3D) representation of data the most popular of them being flexographic printing, which uses flexible relief plates or sleeves. In a traditional flexographic prepress process with chemical etching there is no possibility of fine control of relief properties other than depth of relief. A flexographic prepress process, however, use direct laser engraving in place of chemical processes, which permits more detailed control. This enables a 3-D cross-section profile of relief elements to be used as controllable and regulated parameters that bear a direct relation to the quality of resulting image reproduction.

Specifically, the shape of cross-section profile directly influences quality of reproduction of small features such as highlight elements and/or file linework details, process tolerance to changes in pressure applied by plate and/or sleeve to substrate and other vital characteristics. A uniform 3D cross-section profile when applied uniformly on all image elements and features, however, results in sub-optimal performance. The reason for the sub-optimal performance is due to different behavior of the various image elements, such as halftone dots and/or linework elements which may differ in size. Several approaches were proposed to cope with this problem.

One approach is applying a cross-section profile of an imaged printing plate 500 including support layer 520 as shown in FIG. 5. Printing plate 500 shows imaged data elements of different sizes such as 512 and 504. A linear slope cross-section to image elements is applied showing that slope angle is a function of image element size. A shallow angle slope 508 is applied on small printing area 504, whereas a steep angle slope 516 is applied on large printing area 512.

FIG. 6 shows another solution utilizing uniform, but more complex, 3D cross-section profile 600. Profile 600 shows a printing area 604, or a first engraved area situated on base 612 which is wider than printing area 604, forming a two stage shoulders 616 resulting in a total relief size 608. Another solution may be a combination of both of the above solutions.

While producing some improvement, all of the above approaches fail to decisively solve the problem because picture element size as a sole parameter is a suboptimal parameter for cross-section profile shape control. In fact, practical experience shows that local environment of specific feature and local gradient of ensuing relief pattern are more relevant parameters.

SUMMARY OF THE INVENTION

Briefly, according to one aspect of the present invention a system for forming an image on a flexographic media includes a digital front end that provides a screened image; locating transition points from data regions to non- data regions in said screened image; determining a distance between pixels in adjacent data and non-data regions; if the distance is greater than a predetermined distance modify said screened image to remove a shoulder of pixels at the transition point; and an imaging device the screen modified image on the flexographic media.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

In the following detailed description, numerous specific details are set forth in order to provide a thorough understanding of the disclosure. However, it will be understood by those skilled in the art that the teachings of the present disclosure may be practiced without these specific details. In other instances, well-known methods, procedures, components and circuits have not been described in detail so as not to obscure the teachings of the present disclosure.

While the present invention is described in connection with one of the embodiments, it will be understood that it is not intended to limit the invention to this embodiment. On the contrary, it is intended to cover alternatives, modifications, and equivalents as covered by the appended claims.

Figure 1:
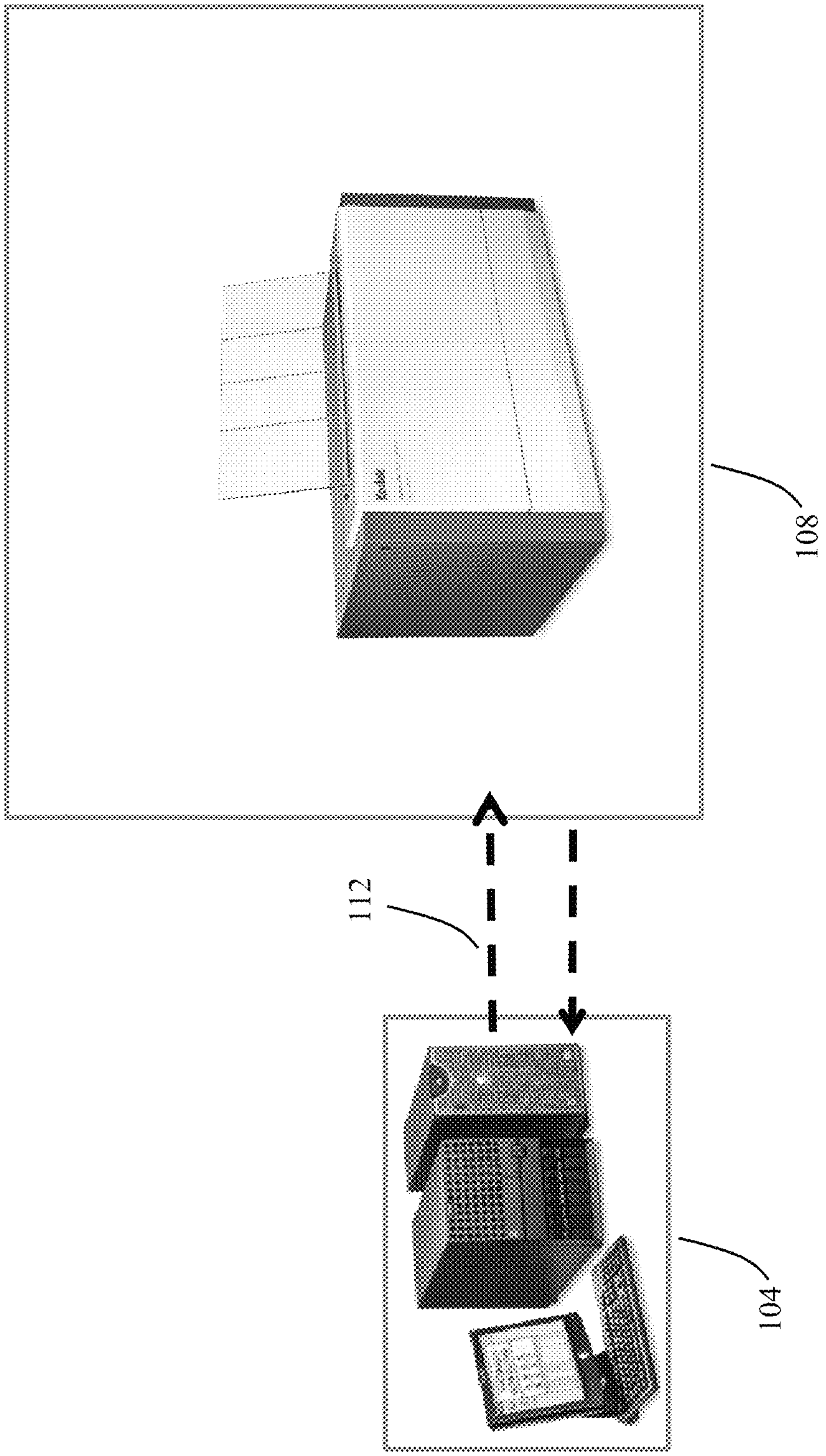
FIG. 1 represents in diagrammatic form of a digital front end driving an imaging device (prior art)

FIG. 1 shows a plate imaging device 108. The imaging device is driven by a digital front end (DFE) 104. The DFE receives printing jobs in a digital form from desktop publishing (DTP) systems (not shown), and renders the digital information for imaging. The rendered information and imaging device control data are communicated between DFE 104 and imaging device 108 over interface line 112.

Figure 2:
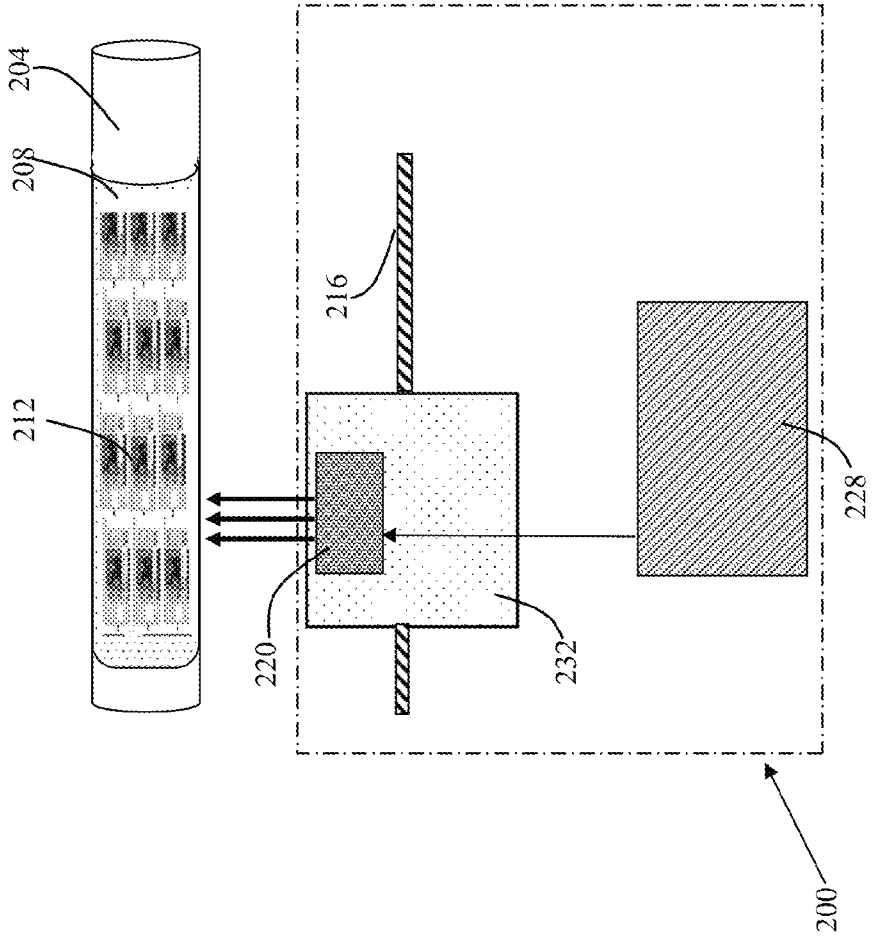
FIG. 2 represents in diagrammatic form the optical displacement sensor (ODS) together with the laser imaging head situated on the imaging carriage imaging on a plate mounted on an imaging cylinder (prior art)

FIG. 2 shows an imaging system 200. The imaging system 200 includes an imaging carriage 232 an imaging head 220 is mounted, imaging head 220 are controlled by controller 228.

The imaging head 220 is configured to image on a flexographic plate 208 mounted on a rotating cylinder 204. The carriage 232 is adapted to move substantially in parallel to cylinder 204 guided by an advancement screw 216. The flexographic plate 208 is imaged by imaging head 220 to form an imaged data on flexographic plate 212 on plate 208.

Figure 3:
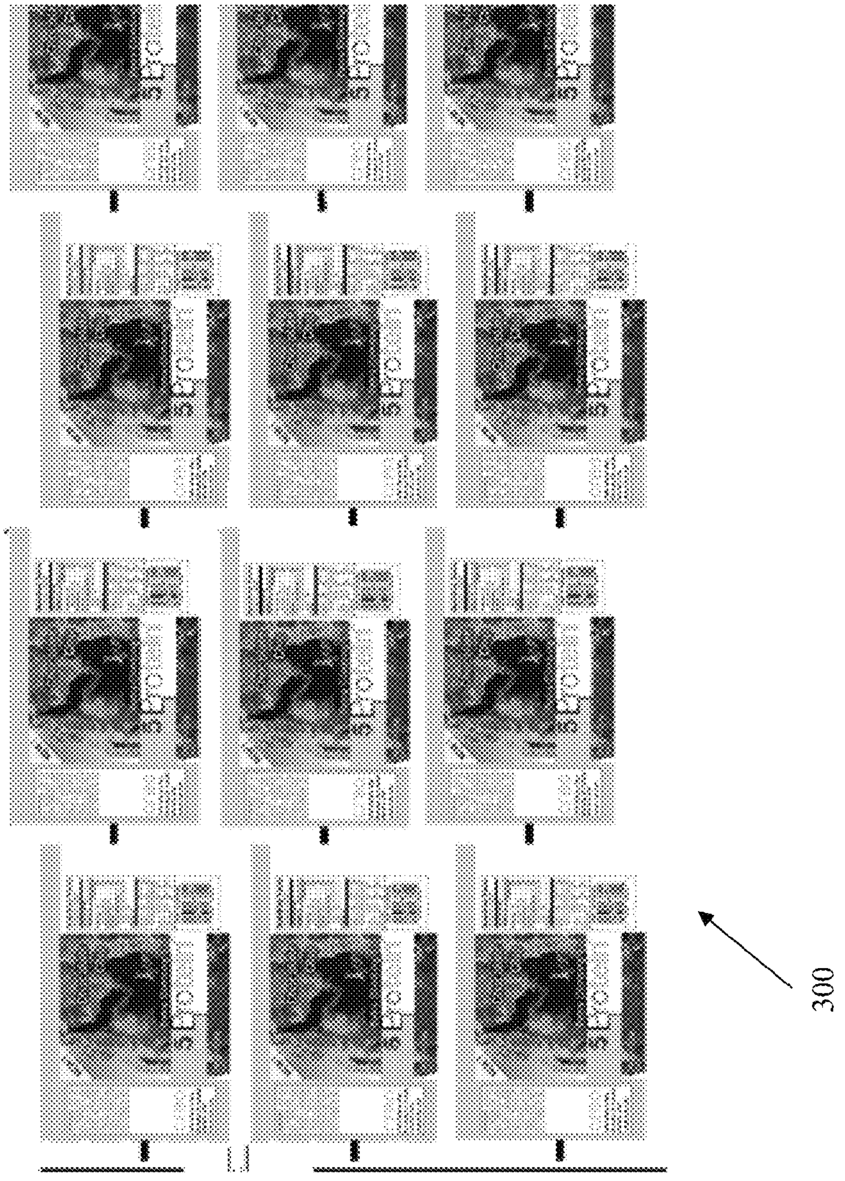
FIG. 3 shows a halftone rendered image (prior art)
Figure 4:
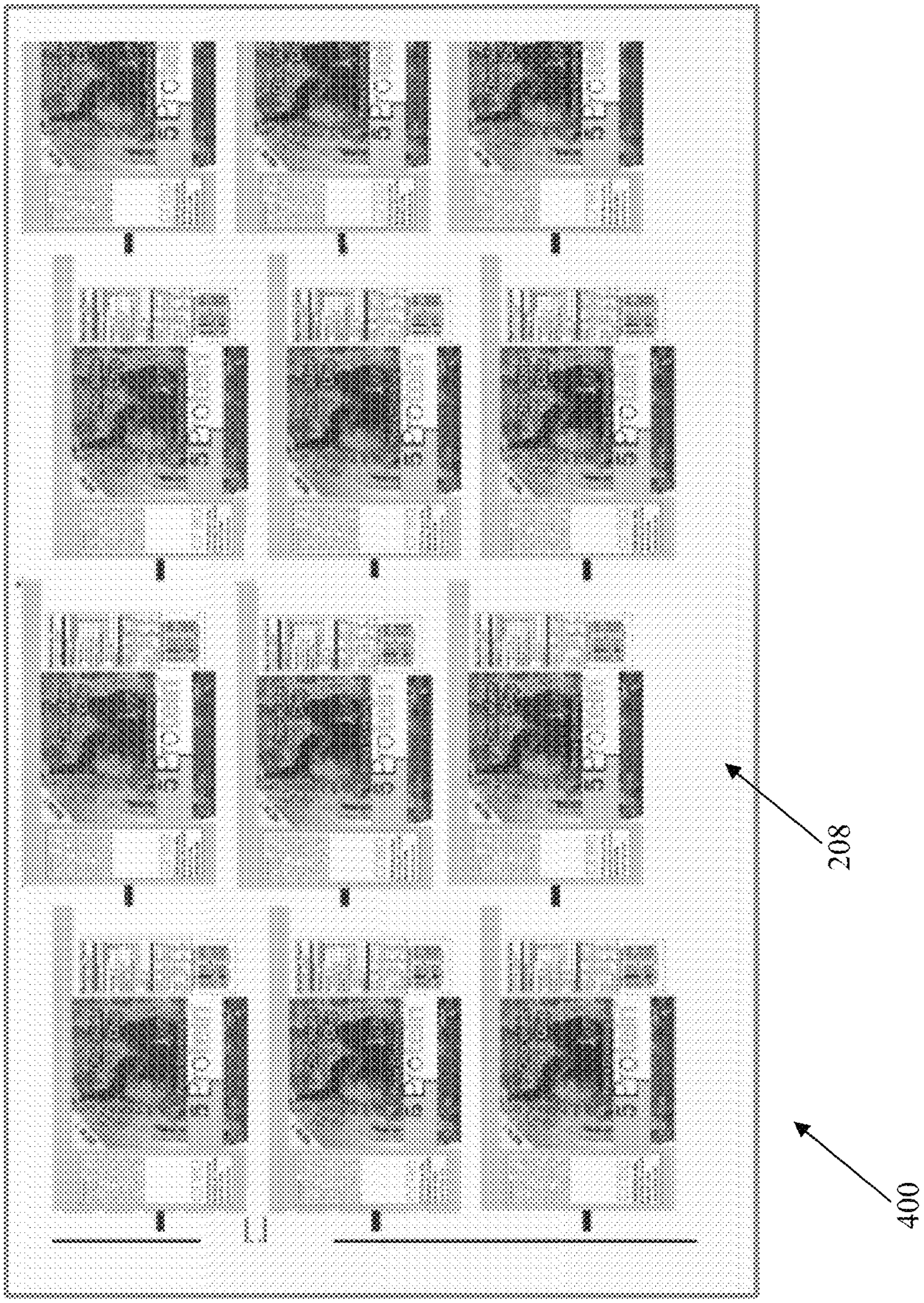
FIG. 4 shows a rendered image on flexographic plate (prior art)
Figure 5:
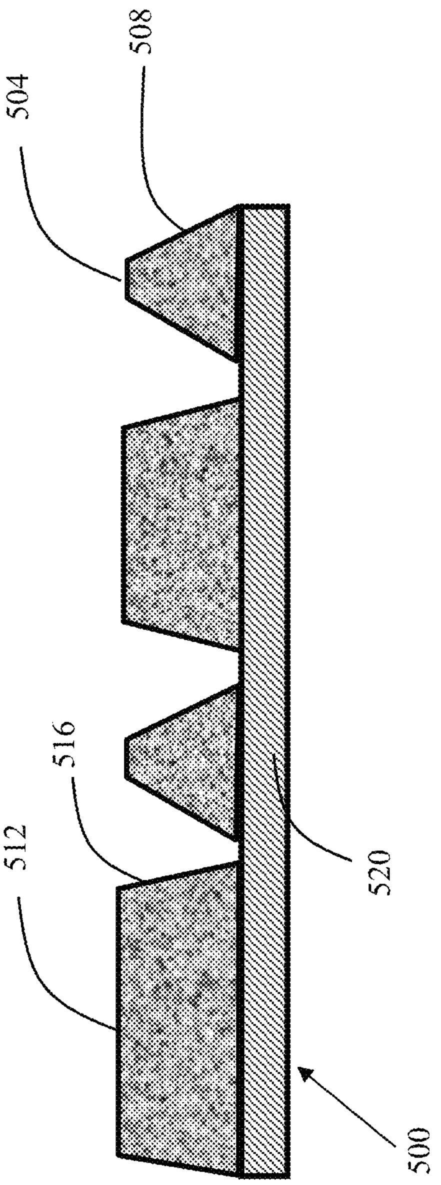
FIG. 5 shows a cross-section of an imaged printing plate including a support layer (prior art)
Figure 6:
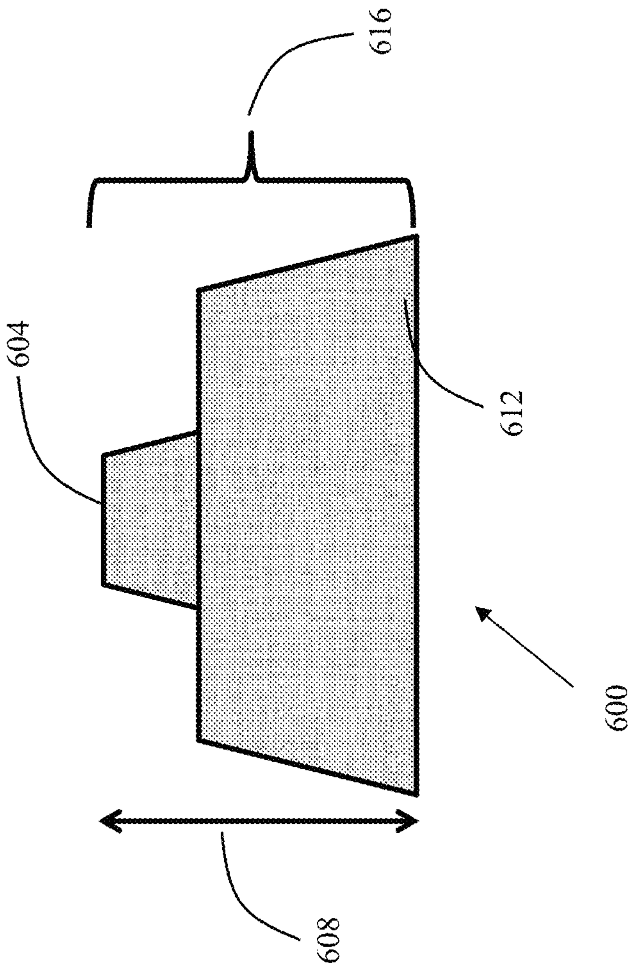
FIG. 6 shows an engraved area situated on base which is wider than printing area forming a two stage shoulders (prior art)

FIG. 3 shows a halftone rendered image 300. The rendered image 300 was prepared by DFE 104, to be further imaged on the flexographic plate 208. FIG. 4 shows rendered image 300 imaged by imaging head 220 on flexographic plate 208 forming an imaged plate 400.

Figure 7:
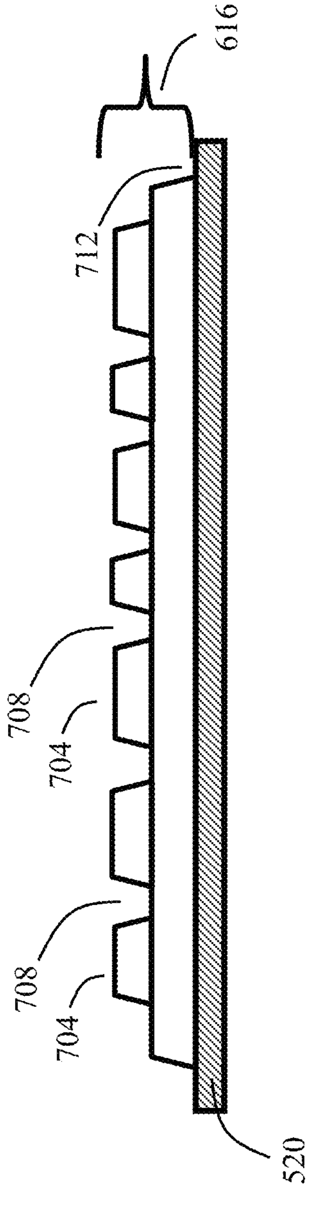
FIG. 7 shows an engraved flexographic plate showing black and white areas.

In order to produce improved reproduction characteristics of image printed by means of relief plates or sleeves control relief of elements profile is suggested. The control relief will be achieved by means of relating to local environment of each addressable physical element (such as minimal physical pixel addressable on plate or sleeve by means of ablating laser), FIG. 7 shows an engraved flexographic plate. Black areas (printed areas) 704 are shown on top surface of unengraved areas on the flexographic plates whereas non printed areas or white areas 708 are engraved on the flexographic plate. White areas at maximal depth are represented by numeral 712.

Specifically, one can logically represent desired relief image carrier such as flexographic plate or sleeve by means of two-dimensional pixel array in such a way that value assigned to each element of said array represents a desired depth of a corresponding physical pixel on said relief image carrier. $V0$ is typically equal to value of zero as is shown on by numeral 704 which represents zero depth relative to unprocessed image carrier, which is an element holding ink during relief printing the process. Value $V\max$ (typically equal to 255 for convenience sake) represents maximum relief depth $D\max$ represented by numeral 712 and as such represents non-imaging blank area. Value $V$ such that $V0<V<V\max$ represents a transition zone ("slope") between imaging relief element and non-imaging blank area in such a way that corresponding intended relief depth is $D\max*(V-V0)/(V\max-V0)$.

At least two different profile functions are defined. $Fi(x,\theta)$ is defined on region $[0,Ximax]$, where $Fi(0, \theta)==V0$ and $Fi(Ximax, \theta]==V\max$, Additionally value of $XMax$ is defined as maximum of $(X1\max, \ldots, XN\max)$, where $N$ is number of defined profile functions.

A two-dimensional pixel array representing relief image carrier is constructed according to the following steps:

a) For each pixel intended to be reproduced on substrate (black area 704) a zero value is assigned.

b) For each pixel intended not to be reproduced on substrate (white area 708, 712) such that its distance from closest black pixel DistB is not less than XMax, let us assign value Vmax.

c) Each remaining pixel ("slope" pixel) can be characterized by its distance from closest black pixel DistB, angle to nearest black pixel $\theta$ and distance from closest assigned white pixel DistW. For every such pixel let us choose relevant profile function $Fi$, where $i=F(DistB, DistW)$, and assign to this pixel value $V=Fi[DistB, \theta]$.

For a preferred embodiment of the invention let us assume that there are two profile functions:

A first function $F1(x,\theta)$ on region $[0,X1\max]$ $F1(0, \theta)==V0$ $F1(X1\max, \theta]==V\max$ for $0<X1<X1\max$ $V0<F1(X, \theta)<=V\max$ for $x>X1\max$ assume $F1==V\max$.

In addition a second $F2(x,\theta)$ on region $[0,X2\max]$, $F2(0, \theta)==V0$; $F2(X2\max, 0]==V\max$ for $0<X2<X2\max$ $V0<F2(X2, \theta)<=V\max$ for $x>X2\max$ assume $F2==V\max$, such that $X2\max<X1\max$.

Constructing a two-dimensional pixel array in two passes, in first pass, use function F1 only. For construction of the array calculate for and associate with each pixel $p[i,j]$ distance $D[I,j]$ from nearest black pixel and angle $\theta$ $[I,j]$ to said black pixel (in case that pixel $p[I,j]$ is black, both these values are equal is zero). As a next step, assign to each pixel value $V[I,j]=F1(D[I,j])$.

At second step, evaluate each pixel $[I,j]$ with assigned value $0<V[I,j]<V\max$. Calculate for each such pixel its "region of interest" size, namely, $R[I,j]=X2\max-D[I,j]$. Pixels in a ROI (Region Of interest) of pixel $p[I,j]$ that is being evaluated are all pixels such that their distance from pixel $p[I,j]$ is not more than ROI size $R[I,j]$.

Introducing bilevel evaluation function $Feval[I,j]$ such that its value is 1 if pre-defined conditions are met and 0 otherwise. In simplest case such pre-defined condition is {value of pixel $p[I,j]==V\max$}. For any one of the pixels in ROI of pixel $p[I,j]$ evaluation function Feval returns 1, assign to pixel $p[I,j]$ value $Vnew[I,j]=F2\ (D[I,j],\theta[I,j])$, otherwise leave value of pixel $p[I,j]$ unchanged. In such a way a relief profile with the desired characteristics is produced depending on local environment of each "slope" pixel.

Figure 8:
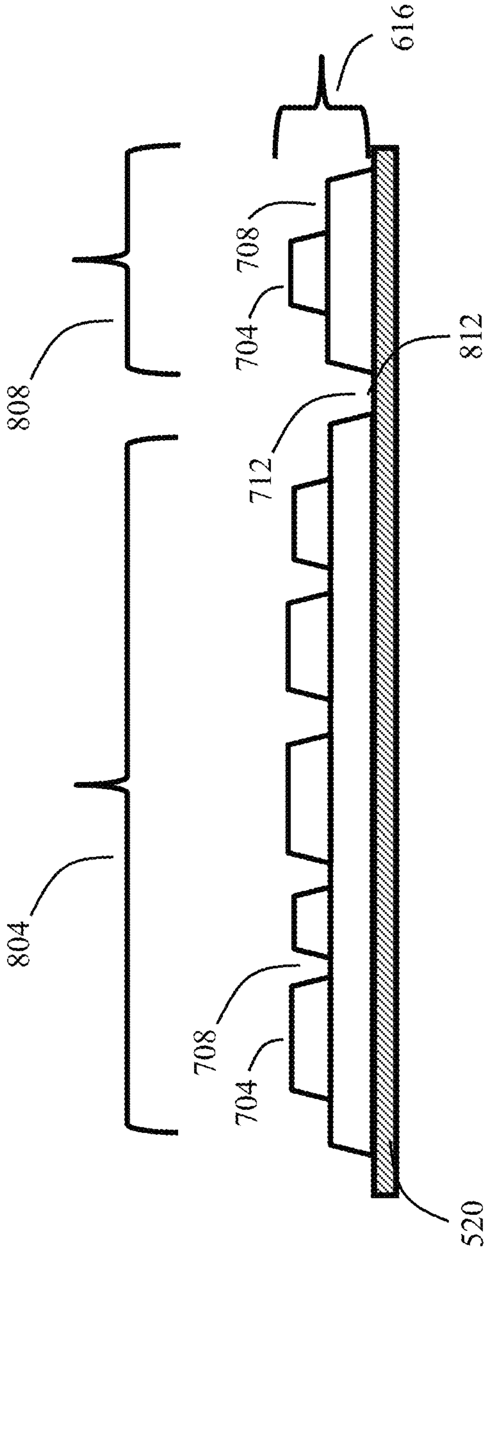
FIG. 8 shows an engraved plate with two neighboring sections separated by a specified distance.

FIG. 8 shows an engraved flexographic plate depicting two neighboring regions of engraved data, a first data region 804 and a second data region 808. The two data regions 804 and 808 are separated by a maximal depth area 812, Each of the neighboring data regions starts and ends with two step shoulder 616 profile. The two step shoulder 616 profiles on each side of data region create an area which may be not wide enough to accommodate ink quantities during printing.

Figure 9:
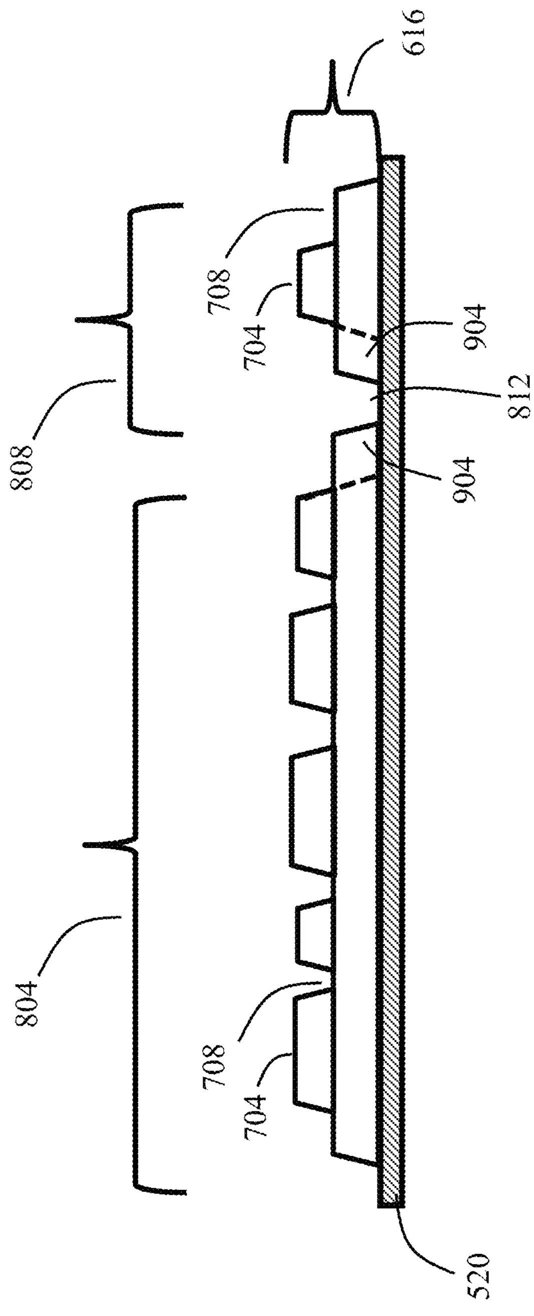
FIG. 9 shows an engraved plate with two neighboring sections separated by a specified distance wherein the neighboring shoulders are marked.
Figure 10:
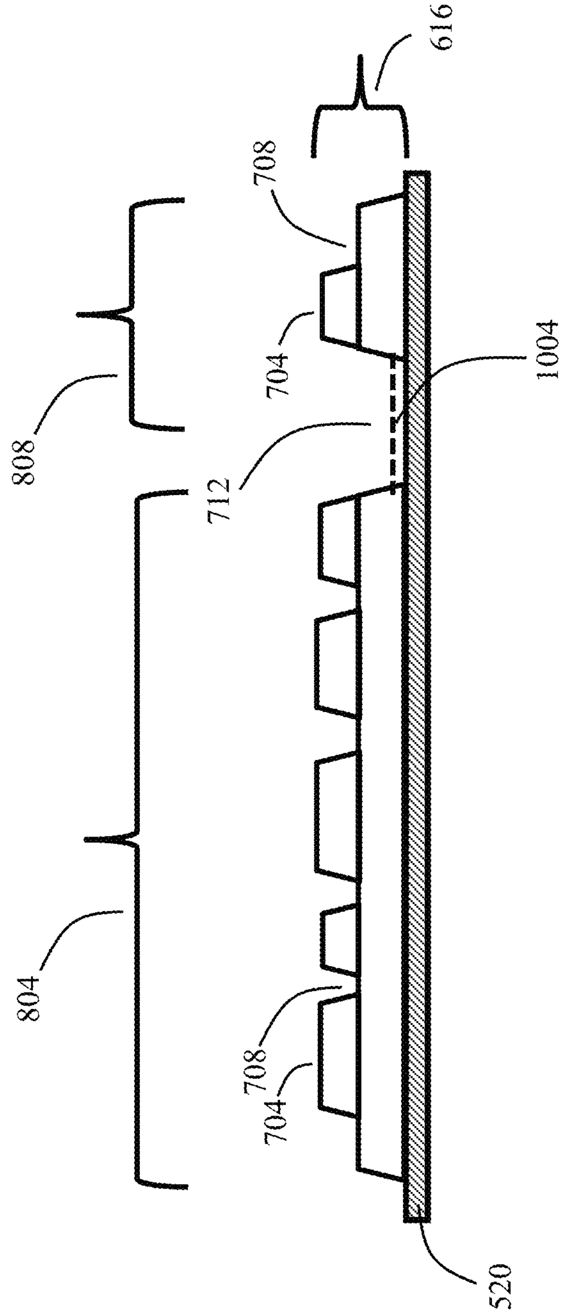
FIG. 10 shows an engraved plate with two neighboring sections separated by a specified distance wherein the neighboring shoulders are cutoff.

This embodiment of the invention detects data area not distant enough. FIG. 9 shows cutting off the bottom shoulders 904 on the neighboring data regions 804 and 808. By cutting shoulders 904 a white area significantly distant from black area 1004 is created as is shown in FIG. 1. Practically a larger volume is formed between data regions 804 and 808 enabling more efficient accommodation of ink during printing, thus minimizing artifacts during printing.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

PARTS LIST

104 digital front end (DFE)
108 imaging device
112 interface line
200 imaging system
204 rotating cylinder
208 flexographic plate
212 imaged data on flexographic plate
216 screw
220 imaging head
228 controller
232 carriage
300 rendered halftone image to be imaged on a plate
400 rendered image imaged on a plate
500 relief area on a imaged printing plate
504 small printing area

508 shallow angle slope
512 large printing area
516 steep angle slope
520 support layer
600 profile of a basic 3D shape
604 printing area
608 relief height
612 shape base
616 two step shoulders
704 black area
708 white area
712 white area—maximal depth
804 first data region
808 second data region
812 maximal depth area
904 cutout shoulder
1004 white area significantly distant from black area

The invention claimed is:

1. A system for forming an image on a flexographic media comprising:

a digital front end that provides a screened image;

locating transition points from data regions to non-data regions in said screened image;

determining a distance between pixels in adjacent data and non-data regions;

if said distance is greater than a predetermined distance modify said screened image to remove pixels at the transition point from the screened image wherein the removed pixels represent a shoulder; and an imaging device images the screen modified image on said flexographic media.

2. The system according to claim 1 wherein said data regions are comprised of at least one white image pixel or at least one black image pixel or a combination thereof.

3. The system according to claim 2 wherein said black image pixel corresponds to a physical pixel with depth of zero relative to a surface of said flexographic media.

4. The system according to claim 2 wherein said white image pixel is significantly distant from any of said black image pixel corresponds to physical pixel with maximal depth relative to surface of said flexible media.

5. The system according to claim 2 wherein said white image pixel is not significantly distant from any of said black image pixel corresponds to physical pixel with depth less than said maximal depth relative to surface of said flexible media.

6. The system of claim 1 wherein the shoulders are removed to a depth greater than a white area.

* * * * *